April 20, 1954   J. W. HAMILTON   2,675,832
FLEXIBLE WAVE GUIDE
Filed Feb. 18, 1950   2 Sheets-Sheet 1
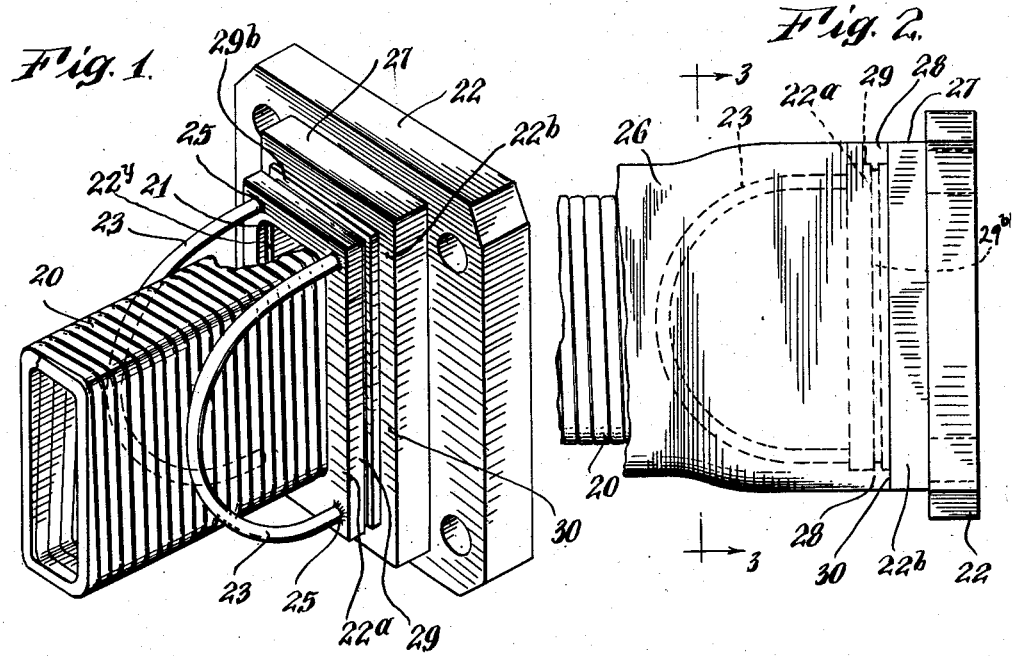
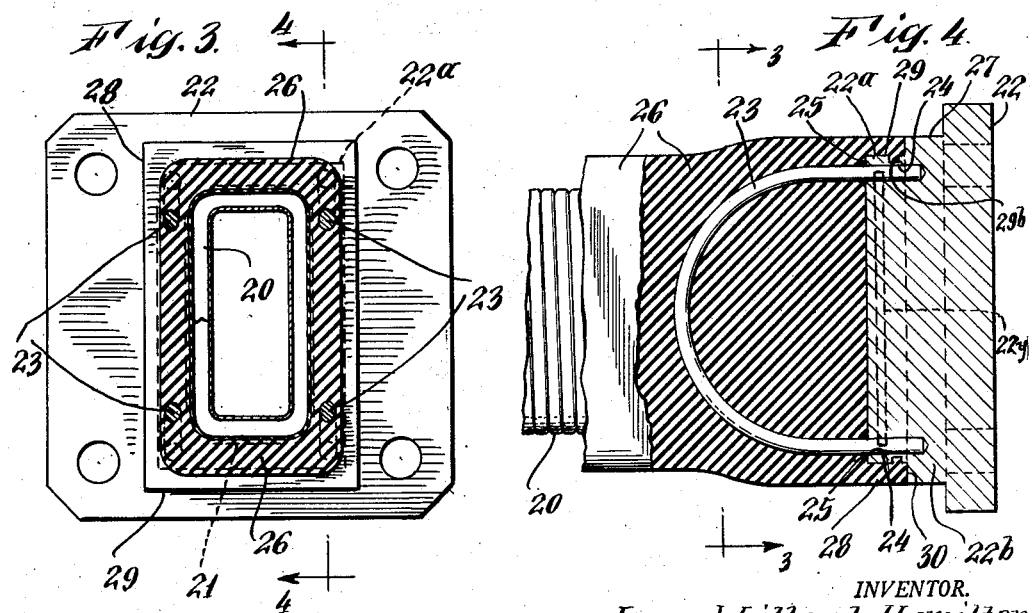
INVENTOR.
Jean Willard Hamilton
BY
Fraser, Myers & Manley
ATTORNEYS April 20, 1954  J. W. HAMILTON  2,675,832
FLEXIBLE WAVE GUIDE
Filed Feb. 18, 1950  2 Sheets-Sheet 2
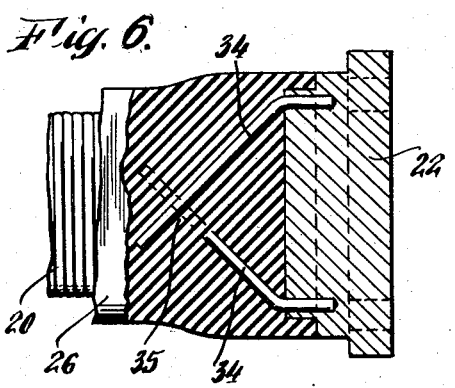
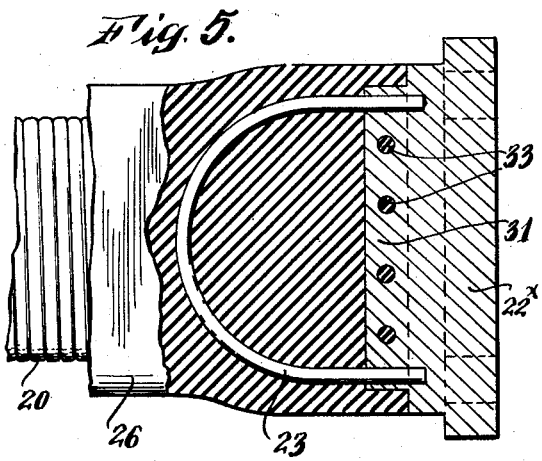
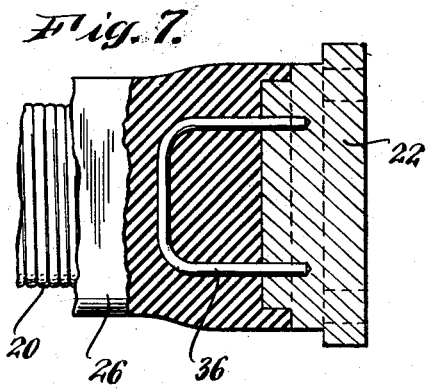
INVENTOR.
Jean Willard Hamilton
BY
Fraser, Myers & Manley
ATTORNEYS.

Patented Apr. 20, 1954

2,675,832

UNITED STATES PATENT OFFICE 2,675,832

FLEXIBLE WAVE GUIDE

Jean W. Hamilton, Montclair, N. J., assignor to Airtron, Inc., Linden, N. J., a corporation of New Jersey Application February 18, 1950, Serial No. 144,919

4 Claims. (Cl. 138—58)

This invention relates to improvements in flexible waveguides such as are used in various types of electronic apparatus for conducting electric energy in the form of micro-waves and, more particularly, the invention relates to means for providing added strength for connections between a hollow, flexible, metal core of rectangular cross-section constituting the energy conducting medium and flanges which are fixed to the ends of the core as means for connecting the waveguide as a part of a circuit in the electronic apparatus.

The conducting core of a flexible waveguide ordinarily is rectangular in cross-section and is made of relatively thin metal, preferably formed in bellows-like corrugations or convolutions so that the waveguide may flex to enable its flanged ends to be aligned with other parts of the electronic apparatus for convenient connection thereto. Such flexing, at intermediate portions of the waveguide, does not impose any excessive strain thereon because such intermediate flexing usually takes place over a rather mild curve which does not strain the thin metal of the core. However, at the point where the core joins the rigid connecting flange, the curvature which occurs when the waveguide is flexed may be very sharp and thus may impose a very severe strain upon the thin metal core material and may cause the core to break at that point. Such breakage would impair the effectiveness of the waveguide and perhaps render it entirely useless for its intended purpose. Furthermore, the breakage may not be noticed at the time it occurs and in such event some difficulty would probably be encountered later in determining and remedying the cause of unsatisfactory operation of the electronic equipment.

Flexible waveguides generally include a jacket of flexible rubber or rubber-like material which is molded around the core and bonded, as well as can be done, to the rigid connecting flanges, provided at opposite ends of the waveguide. This jacket serves as a means for insulating the flexible core from other parts of the apparatus in which the waveguide is installed and also has been utilized to some extent as a means for reinforcing the core, particularly at the point of connection of the core to the flanges. The jacket also has served to aid in maintaining increased pressure of air or other gas within the waveguide to derive improved conductivity therefrom, and for that reason it has been sought to provide a firm airtight connection of the ends of the jacket with the rigid connecting flanges of the waveguide. For the latter purpose, the flanges heretofore have been provided in some instances with grooves into which the rubber-like material of the jacket flows when the latter is being molded upon the waveguide; and bonding strips of special rubber composition have also been employed to secure a good bonding of the jacket material to the flanges.

It has been found in practice, however, that neither the mentioned grooving of the waveguide flanges nor the mentioned special composition rubber bonding strips are entirely satisfactory for their intended purpose for, even when those expedients are employed, it has been found that, when the waveguide is flexed, the rubber-like material of the jacket often separates from the flanges. Such separation permits fluid pressure leakage from within the waveguide between the jacket ends and the adjacent flanges so that pressure cannot thereafter be maintained within the waveguide. Of course, if such separation occurs before or at the time of initial installation the waveguide may readily be replaced, although at some expense. However, such separation sometimes may not occur until after the waveguide has been in service for a time, thus necessitating replacement at considerable inconvenience and expense when it develops that the waveguide cannot retain pressure and that the core may have split or completely broken at its point of connection with a flange.

An important object of the present invention, therefore, is to provide means for opposing excessive bending of the waveguide core in the vicinities of its connection to the flanges, thereby obviating the possibility of breakage of the core at those points.

Another important object of this invention is the provision of an improved mechanical interlock between the rubber-like jacket of a flexible waveguide and the flange or flanges thereof so that the jacket will not separate from the flanges, so that the waveguide may effectively retain pressure therewithin and the rubber jacket material may serve as reinforcing means for preventing excessive bending and resultant breakage of the core at the points where the latter is connected to the flanges.

Another important object of this invention is the provision of core supporting means which are sufficiently rigid to prevent excessive bending and resultant breakage of the core at the points where the latter is connected to the flanges and which also serve as mechanical interlocking means between the rubber-like jacket and the flanges to afford additional strengthening of the core ends against possible breakage while, at the same time, assuring a firm and continued bond between the rubber jacket and the flanges so that the waveguide may hold and continue to hold pressure therewithin to enable it to operate most efficiently.

The foregoing and other objects are accomplished in a broader aspect of this invention by providing wire extensions fixedly associated with the flanges around which extensions the rubber-like material of the jacket may flow when the latter is molded in place, thereby assuring a firm mechanical interlock between the jacket and the flanges. The extensions may be relatively rigid and may extend longitudinally from the flanges for some distance, in close proximity to the core, in position to be embedded within the jacket material so that such means will form the mentioned interlock and at the same time will constitute a relatively rigid support alongside the core to prevent it from excessive bending in the region where it is connected to the flanges.

In the accompanying drawings, several illustrative embodiments of the invention have been shown in order to afford an understanding of the inventive concept without, however, limiting the invention to the particular illustrated embodiments.

Figure 1 of the drawings is a perspective view of one end of a flexible waveguide, the rubber-like jacket being omitted therefrom and the core being broken away in order to clearly show underlying parts.

Fig. 2 is a side elevational view of one end of a waveguide according to Fig. 1 including a portion of a jacket of rubber-like material.

Fig. 3 is a vertical cross-sectional view on lines 3—3 of Figs. 2 and 4.

Fig. 4 is a longitudinal sectional view on the lines 4—4 of Fig. 3.

Figs. 5, 6 and 7 are views of the asme general character as Fig. 4, but illustrating further possible embodiments of the invention.

Referring first to the embodiment illustrated in Figs. 1-4 inclusive, the waveguide comprises a hollow thin metal corrugated core 20 of rectangular cross-section, the ends of which are each similarly disposed within a rectangular bore 21 in a rigid metal flange 22 and held in place therein by solder (not shown) which preferably extends completely around the core and within the bore to form a rigid and preferably fluid-tight interconnection between the core and the flange.

Substantially semi-circular extensions 23 in the form of relatively rigid bent wires are associated with the flange 22 by having their opposite ends seated within bores 24 in an inner shoulder portion 22a of the flange and which preferably are held therein by being soldered as at 25. As best seen in Figs. 1 and 3, the extensions 23 extend longitudinally of the waveguide and lie close to the core 20 at opposite sides thereof. By being positioned close to the core, they serve as a means for limiting sidewise bending of the core at its end portions in the vicinity of the flange, and therefore, serve as a means which obviate weakening or breakage of the core in that vicinity.

After the extensions 23 have been secured in place, during the assembly of the waveguide, a jacket 26 of rubber or rubber-like material is molded about the core 20 throughout the latter's entire length, and the molds are so designed that the jacket material preferably is flush with the outer periphery 27 of an outer shoulder portion 22b, and an end portion 28 of the jacket overlies the outer periphery 29 of the inner shoulder portion 22a and extends into intimate abutting engagement with a rectangular, radially extending surface 30 which defines one end of the outer shoulder portion 22b. During the molding of the jacket 26, the rubber or rubber-like material of which it is constituted also flows completely about and within the extensions 23 so that the latter are completely embedded within the jacket material. Thus, the mentioned extensions constitute a very effective mechanical interlock between the flanges and the jacket material so that the bond between the two is not subjected to any material stress that might tend to cause them to separate. It should therefore be apparent that the presence of the extensions 23 as core supports and the fact that they interlock completely within the jacket material to prevent separation of the jacket from the flanges, results in the complete realization of this invention's stated objective of preventing fracture of the core at the points where it is joined to the flanges.

Before the jacket is molded, in producing waveguides according to Figs. 1-4 inclusive, the portions of the flange with which the jacket material is to contact and likewise the outer surfaces of the core preferably are suitably prepared either with bonding material or by other suitable means so that a firm bond will result between the jacket and both the core and the flange, thereby rendering the waveguide suitable for containing air or other gas under pressure.

The outer periphery 29 of the shoulder portion 22a of the flange may be grooved, if desired, as at 29b, and an inner peripheral groove 22y may be formed in the bore 21 at the shoulder portion 22a to afford even greater assurance that the connection between the jacket and the flange will be air-tight. Either or both of these grooves, filled with jacket material, make a more circuitous path which contained air would have to follow in order to escape from the waveguide. In addition, the limitation of bending of the core, imposed by the extension 23, prevents the jacket material from peeling away from or otherwise loosening from said groove or grooves.

Fig. 5 illustrates a further embodiment having both a relatively thin flange 31 with holes 33 therein and semi-circular extensions 23 of the character included in the embodiment of Figs. 1-4. The jacket material extends through the holes 33 so that the flange 31 functions as a mechanical interlock supplemental to the wire extension 23. It should be apparent, however, that the longitudinal extension of the flange 31 is very slight as compared to the wire extension 23. For that reason, the flange 31, alone, is incapable of affording such side support for the end of the core 20 as would prevent excessive bending and breaking thereof. The wire extension 23, however, does give such side support to the core 20.

The embodiment illustrated in Fig. 6 differs from that illustrated in Figs. 1-4 inclusive only in that each extension instead of being semi-circular in form is generally triangular in form and is constituted of two bent wires 34 which may be associated with the flange 22 in the same manner as described with reference to the semi-circular extensions 23 and the wires 24 may cross each other toward their free ends as at 35. These bent wires are held in their positions and shapes as shown in the drawing both by reason of their rigidity and by reason of the fact that the jacket material completely embraces them.

The embodiment illustrated in Fig. 7 differs from that illustrated in Figs. 1–4 inclusive only in that the extensions 36 are somewhat smaller than the extensions 23 and are in the form of a U with flat sides and bottom.

It should be noted that, within this invention, a union, coupling or other connection member may be utilized instead of flanges 22, 22x; therefore, the terms "connecting flange" or "flange" as employed herein and in the accompanying claims are to be considered as of a breadth which includes all connection members suitable for use as means permitting connection of waveguides in the apparatus in which they are employed.

It should be obvious that the present invention may be practiced in various ways additional to those shown and described herein and that this invention, therefore, should not be limited except as set forth in the following claims.

What I claim is:

1. A flexible waveguide comprising a hollow, flexible core of thin, conductive metal, a rigid end connection flange to which an end of said core is fixed, the rigid material of said flange being relatively strong and the thin material of said core being relatively weak and thereby causing a tendency for breakage adjacent to the juncture of the two when the waveguide is flexed, a jacket of flexible, rubber-like material surrounding the core and engaging said flange, and reinforcing means opposing such tendency for breakage; said reinforcing means comprising substantially similar, wire extensions integrally associated with said flange and overlying opposite sides of said core in spaced relation thereto adjacent to said juncture, and said extensions each being integrated with said flange at two spaced points and the wire thereof extending from said points, longitudinally of the waveguide, at least to the longitudinal extent of the part of the core subject to such breakage tendency, and coming substantially together at a point remote from the flange to constitute a loop enclosing an area of substantially greater width and breadth than the thickness of the wire forming the extension; the said extension being substantially completely embedded within the rubber-like jacket material of which a portion thereof is disposed between said extension and said core and a portion thereof extends within and completely fills said loop; the latter and the jacket material therewithin and adjacent thereto constituting a structure which is less rigid than said flange and more rigid than a part of the core and jacket of the waveguide which is more remote from said flange, whereby to oppose separation of said jacket from said flange and prevent excessive bending of said core adjacent to said flange, thereby preventing such breakage.

2. A flexible waveguide according to claim 1, the said core being oblong-rectangular in cross-sectional shape and said extensions overlying opposite broader sides of said core.

3. A flexible waveguide according to claim 1, the said extensions each comprising a single U-shaped wire fixed at its opposite free ends to said flange at the latter's two mentioned spaced points.

4. A flexible waveguide according to claim 1, the said extensions each comprising two wires, separately fixed to said flange at the two said spaced points and extending longitudinally of the waveguide and toward and into close association with each other.

References Cited in the file of this patent
UNITED STATES PATENTS

| Number | Name | Date |
|---|---|---|
| 2,324,992 | Reising | July 20, 1943 |
| 2,416,177 | Hollingsworth | Feb. 18, 1947 |
| 2,447,697 | Gotschall | Aug. 24, 1948 |
| 2,502,313 | Dodge | Mar. 28, 1950 |
| 2,556,187 | Ingalls | June 12, 1951 |